(12) United States Patent
Watanabe

(10) Patent No.: US 7,710,877 B2
(45) Date of Patent: May 4, 2010

(54) COMMUNICATION CONTROL SYSTEM

(75) Inventor: Naotoshi Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 208 days.

(21) Appl. No.: 11/779,447

(22) Filed: Jul. 18, 2007

(65) Prior Publication Data
US 2007/0258440 A1 Nov. 8, 2007

Related U.S. Application Data

(63) Continuation of application No. PCT/JP2005/002728, filed on Feb. 21, 2005.

(51) Int. Cl.
*G01R 31/08* (2006.01)
(52) U.S. Cl. .................. 370/235; 370/351; 370/395.42
(58) Field of Classification Search .................. None
See application file for complete search history.

(56) References Cited

U.S. PATENT DOCUMENTS

| 7,068,640 | B2* | 6/2006 | Kakemizu et al. | 370/349 |
| 7,079,499 | B1* | 7/2006 | Akhtar et al. | 370/310 |
| 7,197,038 | B1* | 3/2007 | Cook | 370/400 |
| 2002/0065932 | A1* | 5/2002 | Kobayashi | 709/233 |
| 2003/0005112 | A1* | 1/2003 | Krautkremer | 709/224 |
| 2005/0207411 | A1* | 9/2005 | Ota et al. | 370/389 |
| 2007/0110043 | A1* | 5/2007 | Girard | 370/352 |

FOREIGN PATENT DOCUMENTS

| EP | 1 244 265 | 9/2002 |
| JP | 2001-345848 | 12/2001 |
| JP | 2002-223228 | 8/2002 |
| JP | 2003-124941 | 4/2003 |

OTHER PUBLICATIONS

International Search Report dated Jun. 7, 2005, from the corresponding International Application.

* cited by examiner

*Primary Examiner*—Phirin Sam
(74) *Attorney, Agent, or Firm*—Katten Muchin Rosenman LLP

(57) ABSTRACT

The present invention relates to a communication control system, and provides specifically a peer-to-peer (P2P) communication control system making it possible to effectively exploit P2P communication within an organizational network. The communication control system includes: an authentication server that authenticates a terminal which requests subscription to a network, sends communication priority information to the terminal whose subscription is permitted, and delivers communication regulation information based on the communication priority information to a router which accommodates the terminal; a terminal that uses a packet, to which the communication priority information sent from the authentication server is appended, to perform communication after having subscription thereof permitted; and a router that monitors the packet sent from the terminal, and imposes a communication regulation on the terminal according to the communication regulation information based on the communication priority information and delivered from the authentication server.

7 Claims, 13 Drawing Sheets

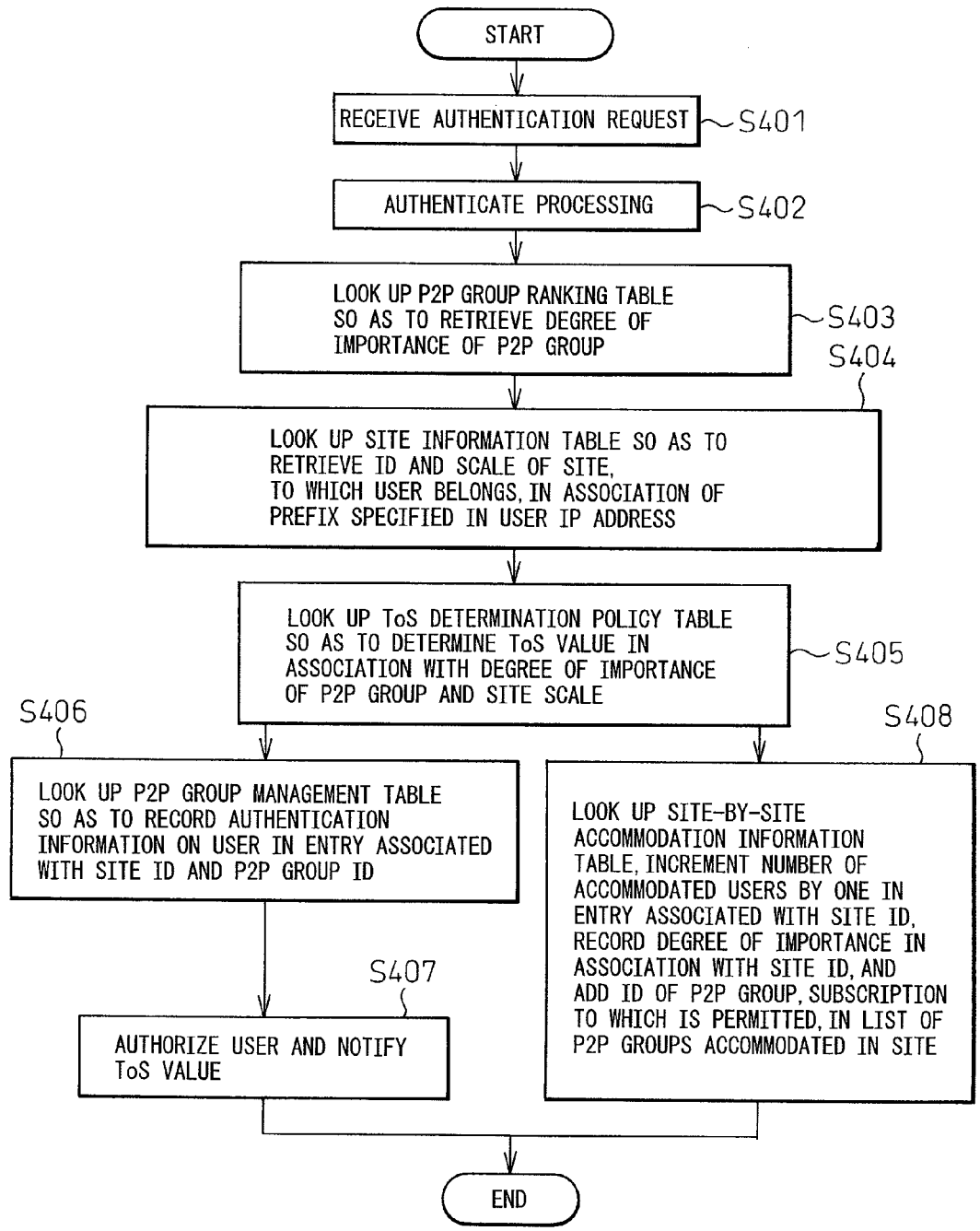

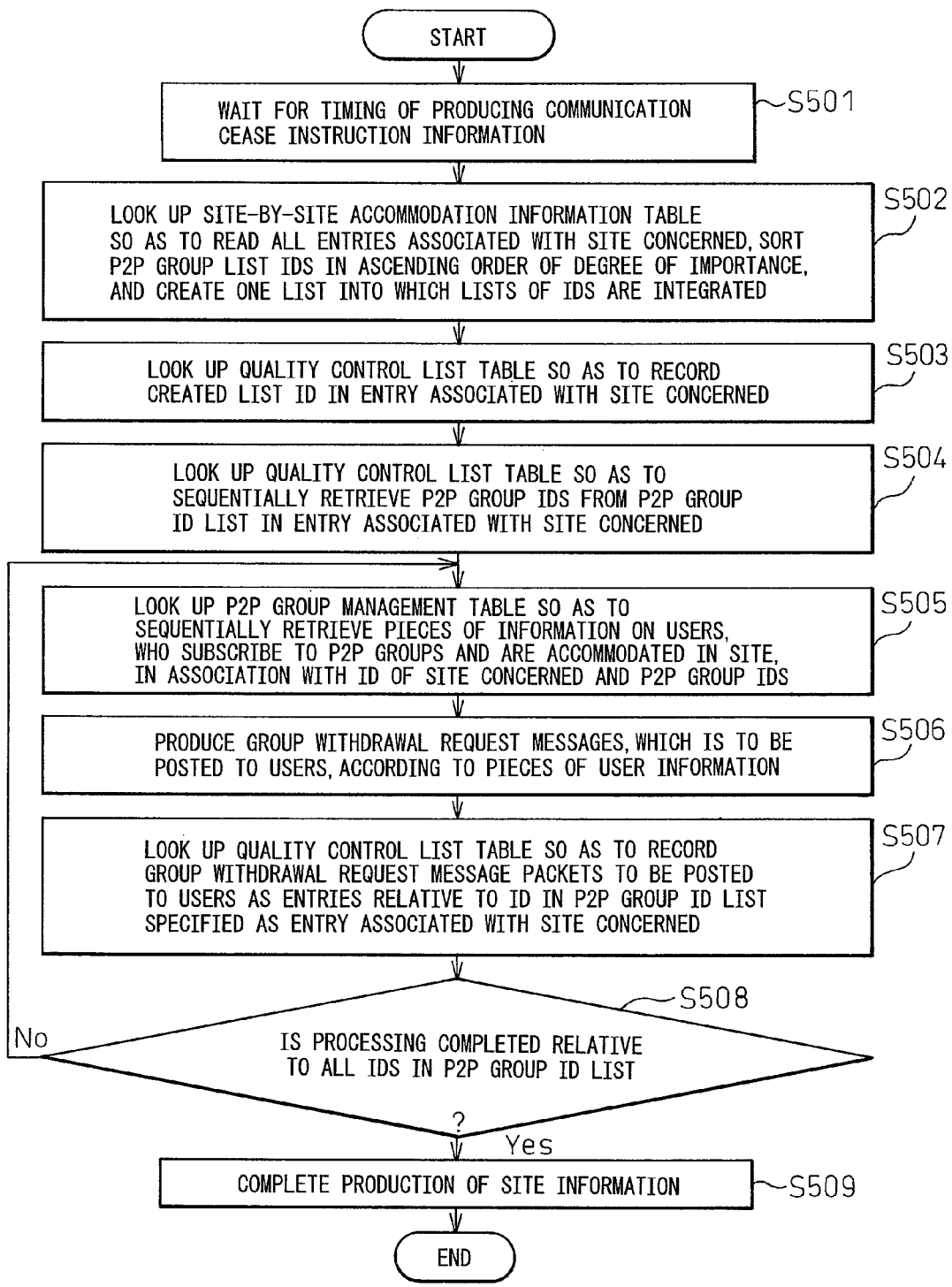

COMMUNICATION CONTROL SYSTEM

CROSS-REFERENCE TO RELATED APPLICATION

This application is a continuation of PCT/JP2005/002728, filed on Feb. 21, 2005, the contents being incorporated therein by reference.

BACKGROUND OF THE INVENTION

1. Field of the Invention

The present invention relates to a communication control system, or more specifically, a P2P communication control system for effectively exploiting peer-to-peer (P2P) communication within an enterprise network constructed using a virtual private network (VPN) service provided by a communication carrier.

2. Description of the Related Art

With the recent growth in broadband connection to the Internet, various P2P applications allowing end users to exchange files over a network are increasing. A P2P application is a kind of file swapping software permitting personal computers (PCs) to directly exchange files over the Internet.

P2P applications are expected to be vigorously utilized within an enterprise network for purposes of (1) forming a secure group of appropriate or necessary members so as to construct a job environment based on the P2P application, and (2) using the P2P application not only to share files, but also to exchange audio and video data, etc.

In this case, an authentication server capable of managing startup of the P2P application or subscribing or unsubscribing of members has to be constructed, and P2P software together with authentication software that accesses the authentication server has to be installed in terminals or devices belonging to each group. Moreover, from the viewpoint of security verification or economy, a VPN service provided by a communication carrier will presumably be used to construct an enterprise network over which headquarters, branch offices, and factories are interconnected.

The amount of traffic whose priority level was relatively high and which was transferred to or from each site or between sites was able to be estimated or planned in the past. An organization has a determined bandwidth, which is allocated to a carrier line leading to each site, according to an estimated or planned value. Traffic sent from each site over a carrier network, carrier network connection relay equipment owned by the organization checks the priority level given to the traffic, and implements priority control on the basis of the result of the check. Thus, quality of high-priority traffic is guaranteed.

Moreover, in the carrier network connection relay equipment at each site from which traffic is transmitted by, for example, the traffic is transferred to a site over the carrier network, so as to control bandwidth according to a design value of the capacity of each site in order to transmit data. The sum total of high-priority traffic originating from respective sites is guaranteed not to exceed bandwidth allocated to a line linking the carrier network and a site, whereby quality of high-priority traffic is ensured. In this case, relay equipment installed in a carrier discards low-priority traffic, which are sent to the site over the carrier network, and exceed bandwidth allocated to the carrier line leading to the site. Quality control provided for an existing carrier VPN service, and the approach to the service by an enterprise are as mentioned above.

However, in a situation in which a P2P application is vigorously utilized within an enterprise network constructed by an existing carrier VPN service, the following problems may be encountered.

(1) Difficulty in Designing Traffic

For the purpose of the above (1) utilizing a P2P application within an organizational network, employees are grouped based on the description of their jobs at various sites, for example, headquarters, branch office, and factories. It is difficult to estimate the amount of traffic occurring between sites linked over a VPN or the occurrence time thereof. In particular, the use of a P2P application increases this kind of traffic and makes estimation of the amount of traffic more difficult.

FIG. 1 shows an example of traffic sent to a site over a carrier network within an existing organizational network.

In the organizational network shown in FIG. 1, multiple sites 20, 30, and 40 belonging to an organization are interconnected over a carrier core network 10 as a virtual private network (VPN). An authentication server 50 owned by the organization is installed within a carrier core network 10. Moreover, customer edge (CE) routers 21, 31, and 41 that interface the carrier core network 10 with the VPN are installed at respective sites 20, 30, and 40.

In this example, P2P applications 22, 32, and 42 or P2P application terminals (hereinafter simply terminals) 22, 32, and 42 that belong to a high-priority group and are authenticated by the authentication server 50 and communicate with one another. A large amount of traffic sent from site 30 or 40 to site 20 takes place. Consequently, the total amount of traffic exceeds bandwidth contracted for a line over which a CE router 21 has network access. As a result, a packet that represents a large amount of traffic and is sent from the site 30 may be discarded (see filled star mark in FIG. 1).

If traffic sent from the transmitting-side site 30 exceeds the bandwidth contracted to the line over which the CE router 31 has network access, a portion of the packet exceeding the contracted value is discarded in the CE router 31.

(2) Prioritization by the Router

The CE router fills the role of Layer-3 relay equipment that is basically designed to handle data packet by packet. The CE router therefore has a bandwidth control feature, but does not have a P2P communication discrimination feature that is needed for P2P communications or a feature that recognizes a P2P group and priority level. The CE router cannot prioritize a P2P application (see x mark in FIG. 1). Therefore, the CE router cannot control traffic according to a priority level or control the bandwidth of high-priority traffic. If high-priority traffic becomes congested, important packets are lost.

(3) High Cost due to Use of Layer 7 Switching

In order to control traffic according to a priority level or control the bandwidth of high-priority traffic, high-order layer processing equipment that operates in Layer 7 and can detect and handle a P2P application is needed.

FIG. 2 shows an example of an organizational network having Layer 7 switches 23, 33, and 43 installed at the respective sites 20, 30, and 40. In this example, the Layer 7 switches are installed independently beside the CE routers 21, 31, and 41. Alternatively, routers dedicated to P2P communications and provided with Layer 7 switches may be adopted.

The Layer 7 switches 23, 33, and 43 detect a P2P application, which should be transmitted over the carrier core network 10, in advance, and transmits the P2P application, which is selected based on the priority level given to the P2P application and the permissible bandwidth, over the carrier core network 10. In this example, congestion in the originating routers 31 and 41 and the terminating router 21, etc. can be prevented.

However, P2P communication arise between any site. Therefore, a Layer 7 switch should be installed at each site 20, 30, and 40. Moreover, since communication between P2P applications generates a large amount of traffic, expensive high-performance high-order layer processing equipment is needed. This leads to an increase in cost needed to construct a network and control equipment. Since a large number of sessions has to be supported in a large scale network, the cost needed to run a network increases.

The countermeasures described below may be adopted for foregoing problems (1) to (3). However, countermeasures cannot thoroughly solve the problems for the reasons described below.

A countermeasure against problem (2) is such that the authentication server 50 assigns a priority level (transmission permission) to a P2P application that cooperates with the authentication server. In this case, data transmission from each of the sites 20, 30, and 40 over the carrier core network 10 can be controlled based on priority levels. However, since the amount of traffic between the sites cannot be recognized because of problem (1), congestion of traffic sent to each site 20, 30, and 40 over carrier core network 10 cannot be controlled.

In this case, authentication server 50 may instruct the terminal installed at a terminating site, which suffers from congestion, to suspend P2P communication or temporarily withdraw from the P2P group. This is effective in reducing the amount of traffic congesting. However, when traffic sent to each site over the carrier core network 10 is congested, an instruction issued from the authentication server 50 may not reach the terminal at the site. Moreover, when a notification of congestion over the carrier core network 10 is posted as a congestion occurrence report to a user enterprise over the carrier core network 10, the report is delayed due to congestion, and the organization cannot take advantage of the report.

A countermeasure for problem (3) is adopted so that relay equipment within the carrier core network 10 collects traffic information in units of priority level or destination site, and the authentication server 50 acquires the information so as to dynamically instruct each relay equipment to control traffic (the contents of the control include, for example, changing of a bandwidth based on which shaping is performed or changing of a threshold for discarding of data according to a priority level). Traffic is therefore controlled in units of a site. However, construction and maintenance of the authentication server 50 is very expensive, and traffic needed to transmit a notification or instructions over the carrier core network 10 increases.

SUMMARY OF THE INVENTION

The present invention addresses the foregoing problems. An object of the present invention is to provide a communication control system that, when P2P communication spreads in an organizational network, uses a system equivalent to a conventional CE router, but does not use high-order layer processing equipment to realize P2P communication economically and that ensures quality.

According to the present invention, there is provided a communication control system including: an authentication server that authenticates a terminal which requests subscription to a network, informs the authenticated and subscribed terminal of its communication priority information, and delivers communication regulation information based on the communication priority information to a router that accommodates the terminal; a terminal that uses a packet, to which the communication priority information informed from the authentication server is appended, to perform communication after having subscription thereof permitted; and a router that monitors the packet sent from the terminal, and imposes a communication regulation on the terminal according to the communication regulation information based on the communication priority information and delivered from the authentication server.

To be more specific, the terminal requests subscription to a predetermined group. The authentication server determines the communication priority information on the basis of the degree of importance of the group, and periodically produces according to a communication regulation a communication-cease eligible group ranking list according to the degree of importance of the group, and delivers the communication-cease eligible group ranking list. The router monitors an amount of traffic represented by packet in units of the communication priority so as to detect congestion. When having detected congestion, the router uses the communication-cease eligible group ranking list to request the terminal, which belongs to a group whose degree of importance is low, to cease communication.

The network is an organizational network realized with a P2P network, and the terminal is a P2P application terminal. The group is a P2P group, and the router is a CE router.

According to the present invention, when the router detects congestion, a terminal belonging to a communication-cease eligible group is instructed to cease communication on the basis of communication priority information based on a degree of importance and informed from the authentication server to the terminal, and information on a communication-cease eligible group ranking list that is periodically delivered from the authentication server to the router and that is based on the communication priority information.

This makes it possible to construct a communication control system capable of ensuring quality according to a communication priority level (i.e. avoiding discarding of important information).

In particular, even when P2P communications are under way, that is, when a large amount of traffic takes place and another network system cannot control equipments installed in each sites due to congestion, an expensive dedicated router that performs high-order layer processing or high-speed processing which is required for P2P communications need not be employed. Thus, a P2P network using existing routers and network resources as they are can be constructed.

BRIEF DESCRIPTION OF THE DRAWINGS

FIG. 11 describes an example of the use of the tables shown in FIG. 10 for authentication; and FIG. 12 describes an example of the use of the tables shown in FIG. 10 for production of communication cease instruction information.

DESCRIPTION OF THE PREFERRED EMBODIMENTS

Figure 3:
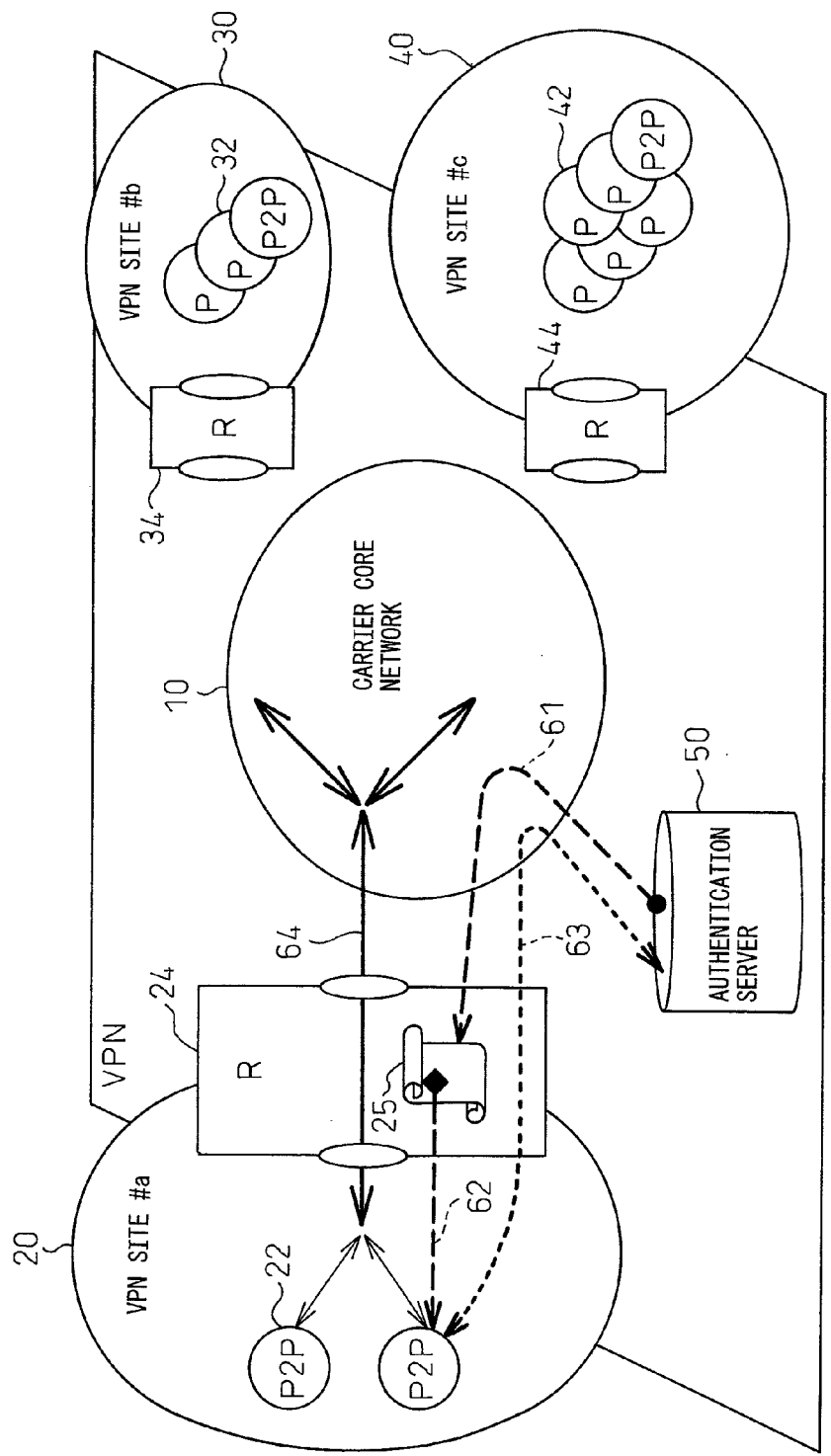
FIG. 3 illustratively shows basic activities performed in a communication control system in accordance with the present invention.

FIG. 3 illustratively shows basic activities performed in a communication control system in accordance with the present invention.

Figure 1:
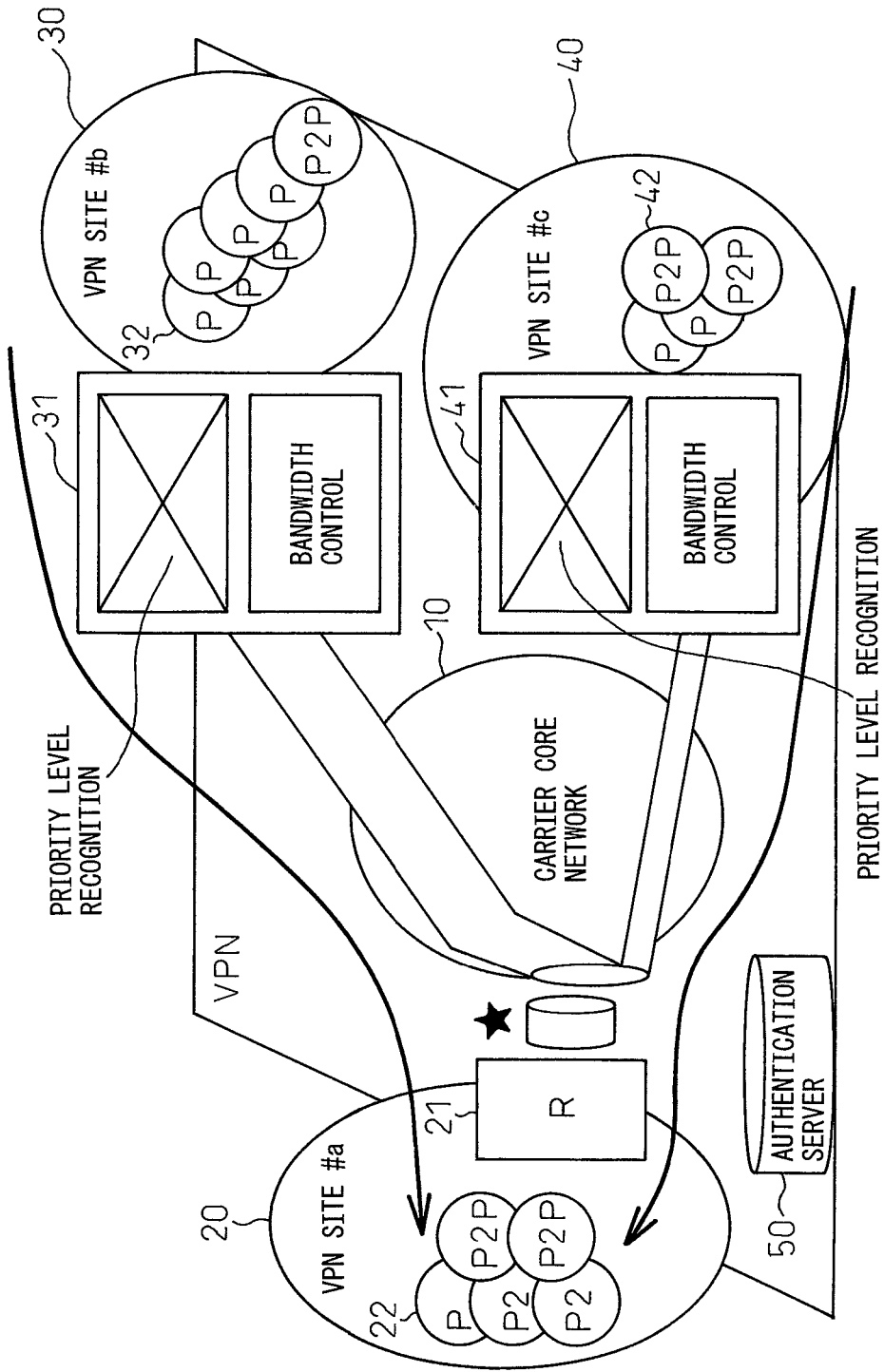
FIG. 1 shows an example of an existing enterprise network to which P2P communications are adapted.
Figure 2:
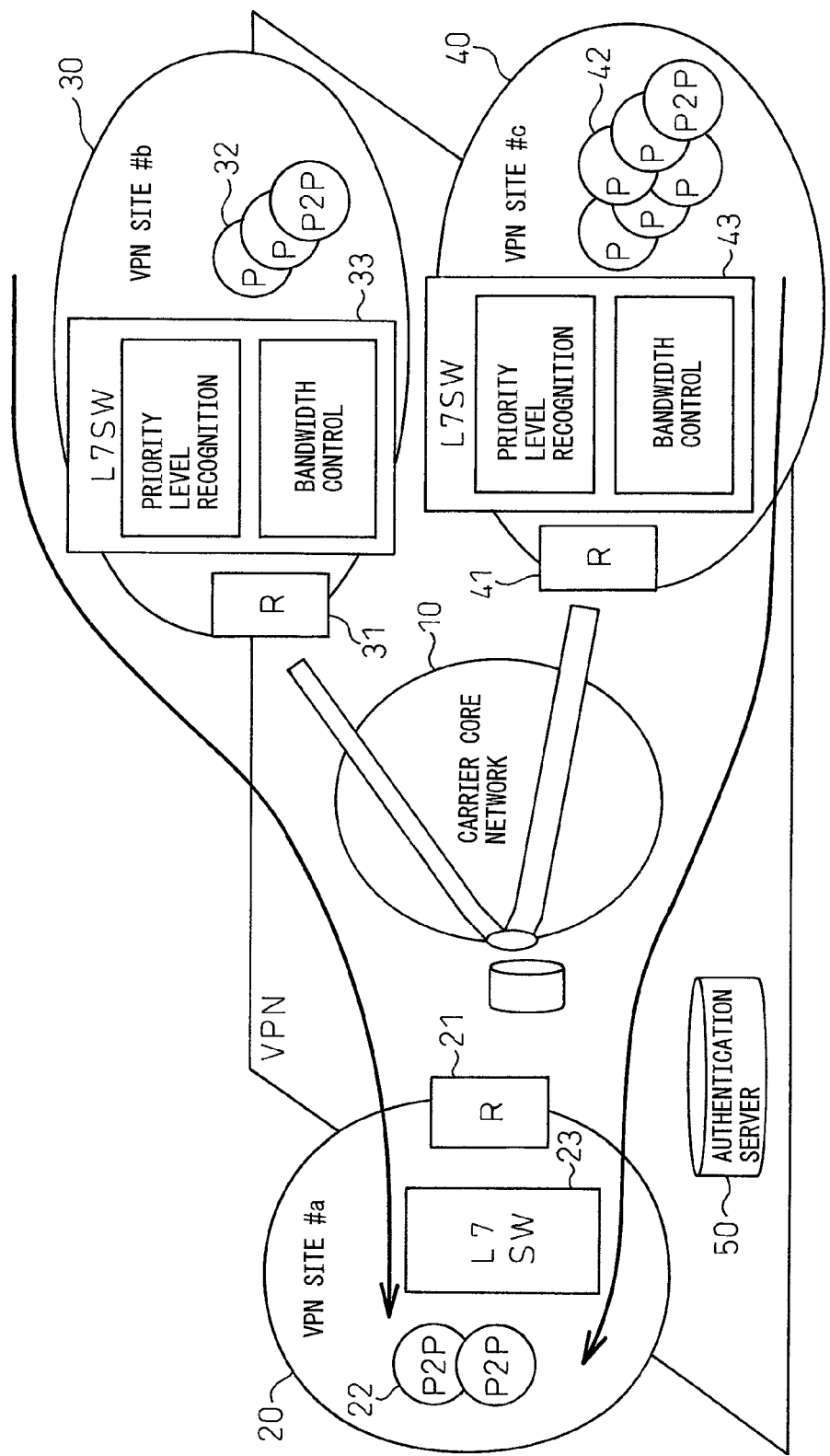
FIG. 2 shows another example of the existing enterprise network to which P2P communications are adapted.

Hardware for a carrier core network 10, P2P applications 22, 32, and 42 installed at respective sites 20, 30, and 40, an authentication server 50, and CE routers 24, 34, and 44, which are shown in FIG. 3, is the same as the existing hardware shown in FIG. 1. This will be described using site 20 as an example. The same applies to sites 30 and 40.

In FIG. 3, when the authentication server 50 is requested to authenticate a P2P application terminal (hereinafter simply a terminal) 22 in relation to a subscription to a certain P2P group or startup, the authentication server 50 not only authenticates a user in the same manner as it does conventionally, but also authenticates the user in relation to a subscription to the P2P group, and determines a packet priority level indicator (i.e. type-of-service (ToS) value), which is used for P2P communication, on the basis of the information on the degree of importance of the P2P group. When subscription to the group is authorized, the priority level indicator (ToS value) is informed to the terminal (63). The authorized terminal 22 uses this ToS value for packets of peer-to-peer-communication with terminals 32 and 42 at the other sites (64).

Based on the information on the degree of importance of the P2P group, the authentication server 50 creates for each site a list 25 of terminals or P2P groups, of which P2P communication is ceased, according to congestion of communication directed from the site 20 over the carrier core network 10. The list 25 is created periodically or created according to the situation of subscription to the P2P group. The created list is delivered to the CE router 24 at each site (61). The CE router 24 stores the received list data in existing memories (ex. RAM) therein.

The CE router 24 always monitors an amount of traffic in relation to each ToS value. When triggered by the fact that a predetermined bandwidth is exceeded (a congestion condition is detected), the CE router 24 looks up the list 25 and instructs the terminal 22 listed in the list 25 at the site 20 to cease communication (62). Consequently, when the terminal 22 ceases communication, an amount of traffic sent from the site 20 over the carrier core network 10 is reduced, and an amount of traffic sent to the site 20 over the carrier core network 10 is also reduced. As a result, the congestion is reduced. The process of receiving the list from the authentication server 50 and instructing the terminal 22 to cease communication is executed using an existing CPU or packet transfer mechanism of the CE router 24. The CE router 24 employed in the present invention can be implemented merely by installing software, which describes the foregoing activities, in the existing CE router.

As mentioned above, according to the present invention, high-order layer processing equipment need not be employed and an existing router can be utilized. Therefore cost of introduction or running can be suppressed. Moreover, since the CE router instructs a terminal to cease communication, a network need not control congestion. Consequently, a terminal at a site can be reliably controlled.

For a better understanding of the present invention, an example of the concrete activities performed in the present invention will be described with reference to the communication sequences shown in FIG. 4 to FIG. 6.

Figure 4:
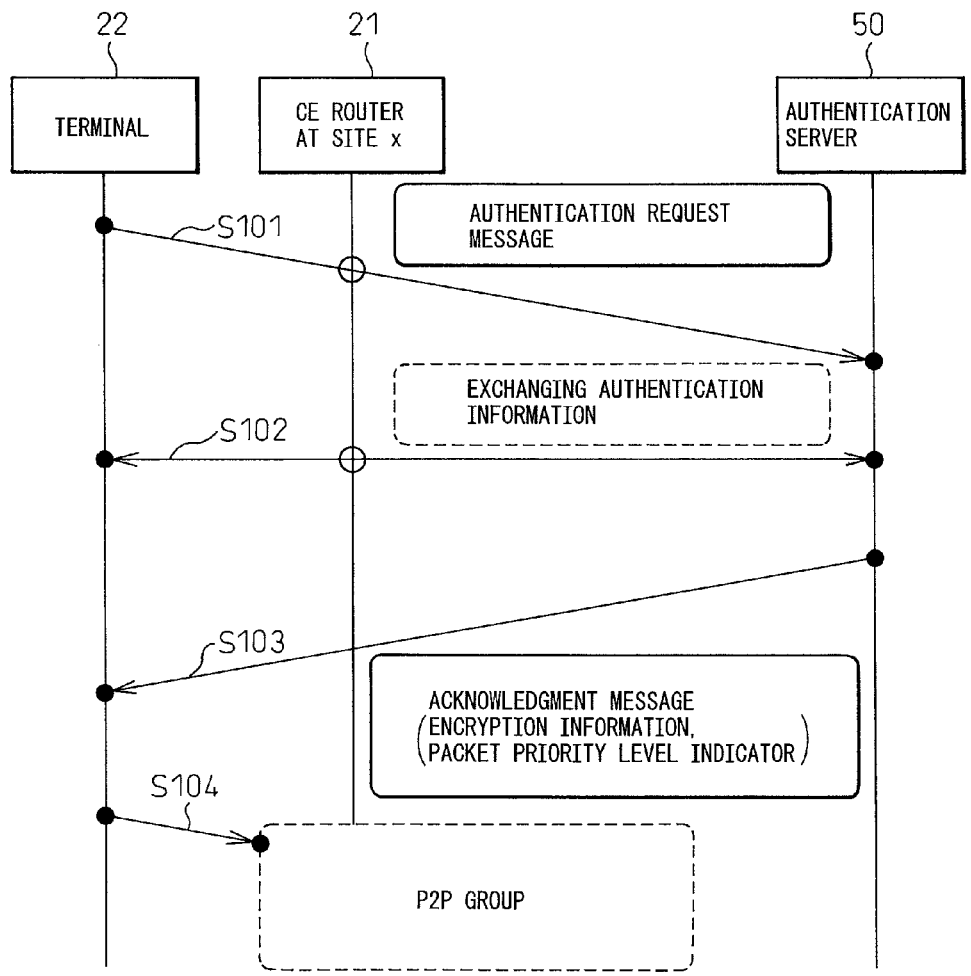
FIG. 4 shows an example of an authentication sequence.

FIG. 4 shows an example of authentication performed between a terminal and an authentication server. The open circle in the drawing indicates a passage point through which a communication packet passes, and a filled circle indicates a termination point of the communication packet. When the communication packet passes through the CE router, the CE router 21 monitors an amount of flowing traffic on the basis of the priority level indicator, and collects statistical information.

In the present example, the terminal 22 that requests subscription to P2P group A transmits an authentication request to the authentication server 50 (S101). The authentication server 50 having received the authentication request exchanges pieces of information required for general user authentication, that is, user ID, password request, and result of password check with the terminal 22. When the terminal user is authorized, the user is checked to see if the user is qualified to subscribe to P2P group A to which the user wants to subscribe (S102). If the user is qualified to subscribe to P2P group A, an acknowledgement is returned to the terminal 22 (S103).

The acknowledgement contains, in addition to pieces of conventional information including encryption information (cipher key) needed to subscribe to P2P group A, a priority level indicator value (ToS value) assigned to a packet communicated within P2P group A. The authentication server 50 determines the ToS value on the basis of the degree of importance of the acknowledged P2P group A. The terminal 22 having received the acknowledgement uses the ToS value to peer-to-peer-communicate with terminals 32 and 42 at other sites 30 and 40 respectively, which belong to P2P group A (S104).

Figure 5:
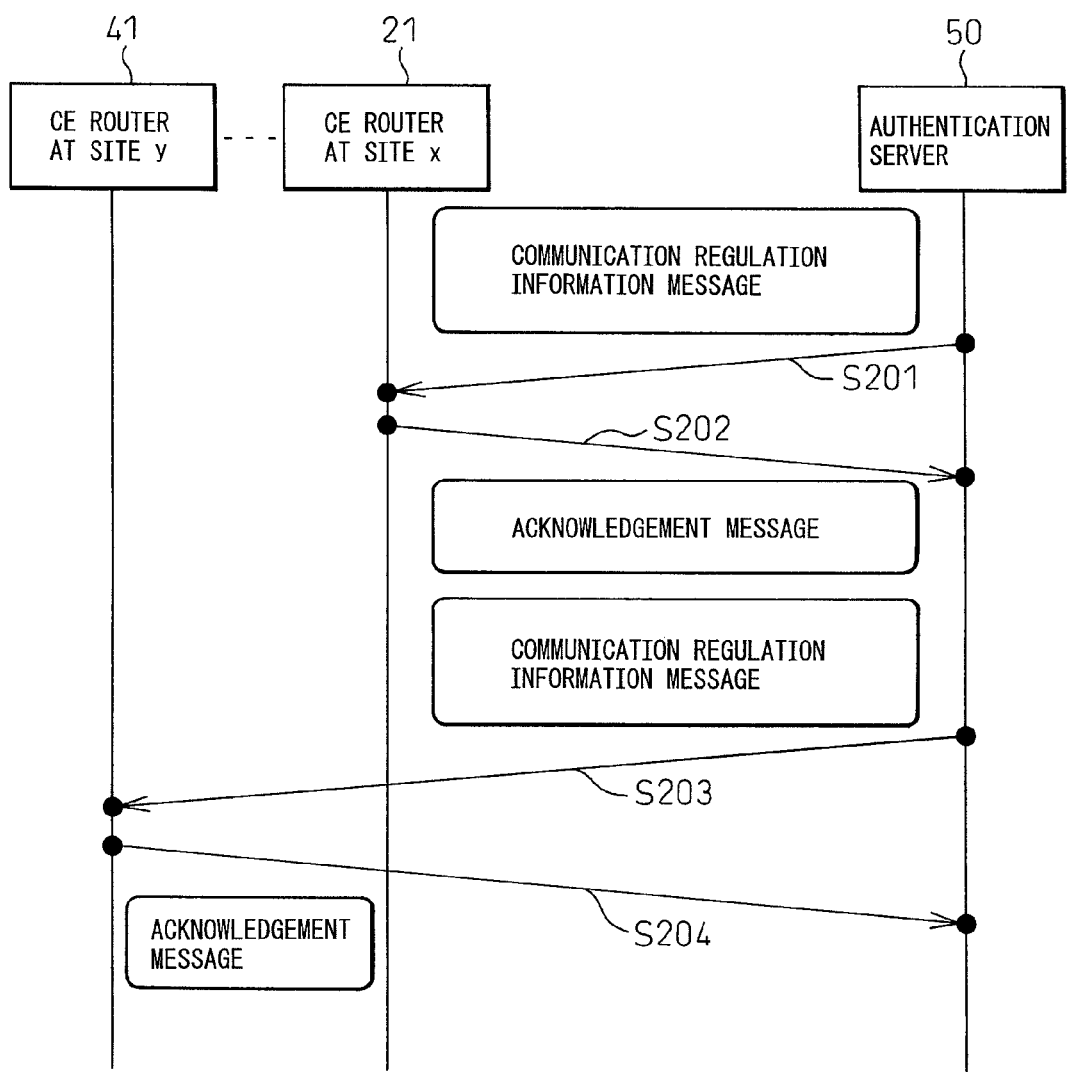
FIG. 5 shows an example of a list delivery sequence.

FIG. 5 shows an example of list delivery performed between the CE router and authentication server.

In this example, the authentication server 50 regularly transmits a communication regulation information message, which contains the latest communication-cease eligible list, to CE routers 21 to 41 at respective sites (S201 and S203). The authentication server 50 regularly creates the list of P2P groups that are instructed to cease their communication with the respective CE routers in units of packet priority level indicator during congestion. The communication regulation information message may be transmitted regularly or may be transmitted to the CE router at a certain site at which the number of P2P groups exceeds a predetermined value.

Figure 6:
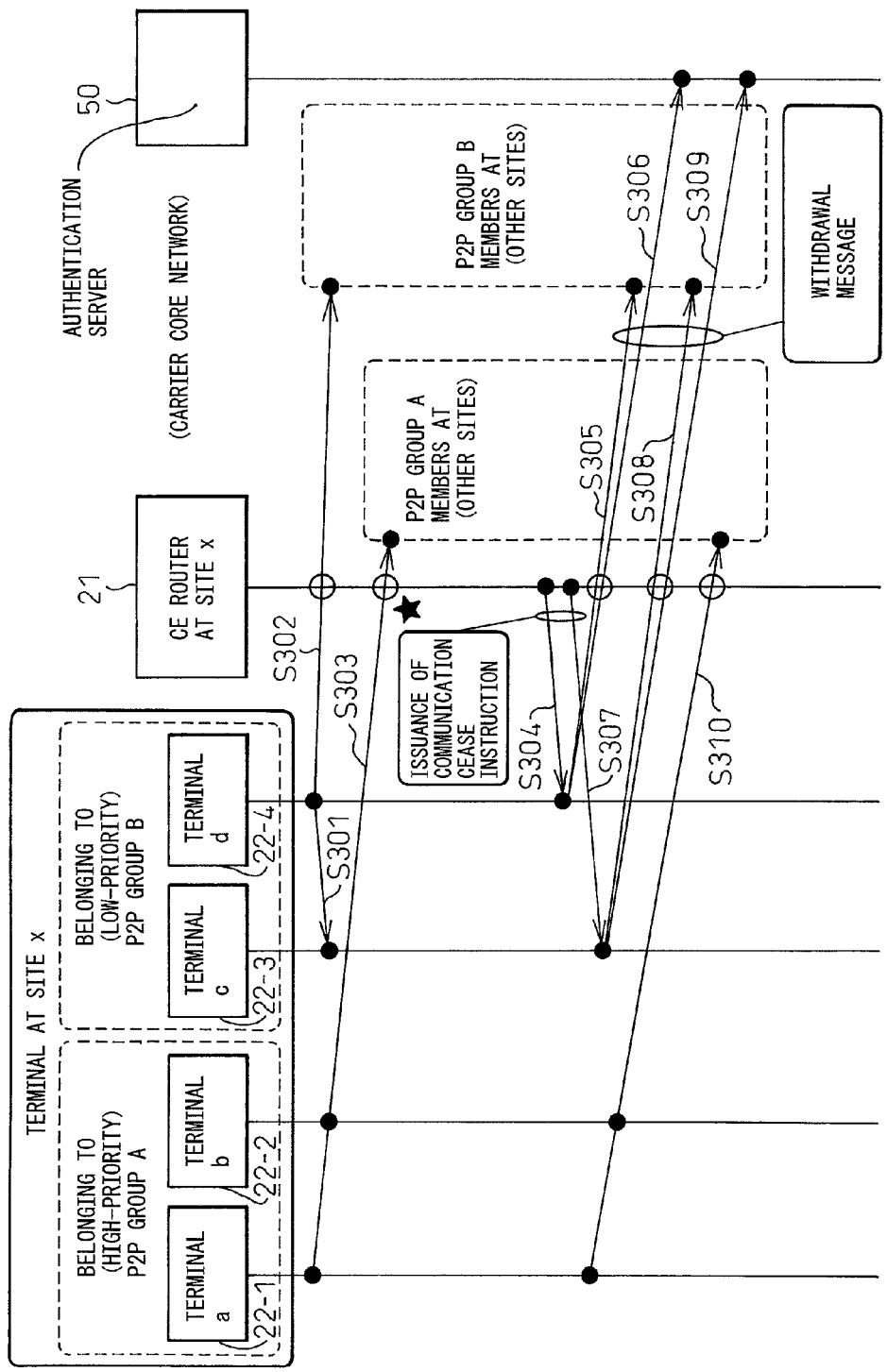
FIG. 6 shows an example of a sequence for sensing congestion.

FIG. 6 shows an example of activities to be performed when the CE router detects congestion.

In this example, the CE router 21 uses a monitoring mechanism included in a conventional router to monitor flow of traffic from the site 20 over the carrier core network 10 (S302 and S303). In this example, when a congestion condition (marked with a filled star mark) is sensed within high-priority P2P group A (S303), the communication-cease eligible list delivered from the authentication server 50 is looked up, and terminals 22-3 and 22-4 belonging to low-priority P2P group B and being accommodated by its own site are instructed to cease their communication (S304 and S307).

The terminals 22-3 and 22-4 having received communication cease instruction send a withdrawal message, which says that the terminals will withdraw from the low-priority P2P group B within which the terminals are communicating with one another, to the authentication server 50 (S306 and S309). At the same time, the terminals send the withdrawal message to the terminals that belong to the group B, reside at the other sites, and are communicating with one another (S305 and S308). Thereafter, terminals 22-3 and 22-4 cease P2P communication with the other terminals belonging to group B. Consequently, since traffic of the low-priority P2P group B ceases, traffic of the high-priority P2P group A can avoid meeting congestion. Terminals 22-1 and 22-2 belonging to the high-priority P2P group A can continue their P2P communication as they are (S310).

In this case, a request for re-subscription to the low-priority P2P group B is left unattended for a certain period of time or a time determined at random within a certain time interval. If the authentication server 50 receives the withdrawal message requesting withdrawal from the P2P group, terminals 22-3 and 22-4 are, as described later, eliminated from a user list included in a P2P group management table. Accordingly, the number of terminals is subtracted from the number of terminals, which subscribe to the P2P group, listed in an accommodation information table created for each site.

Figure 7:
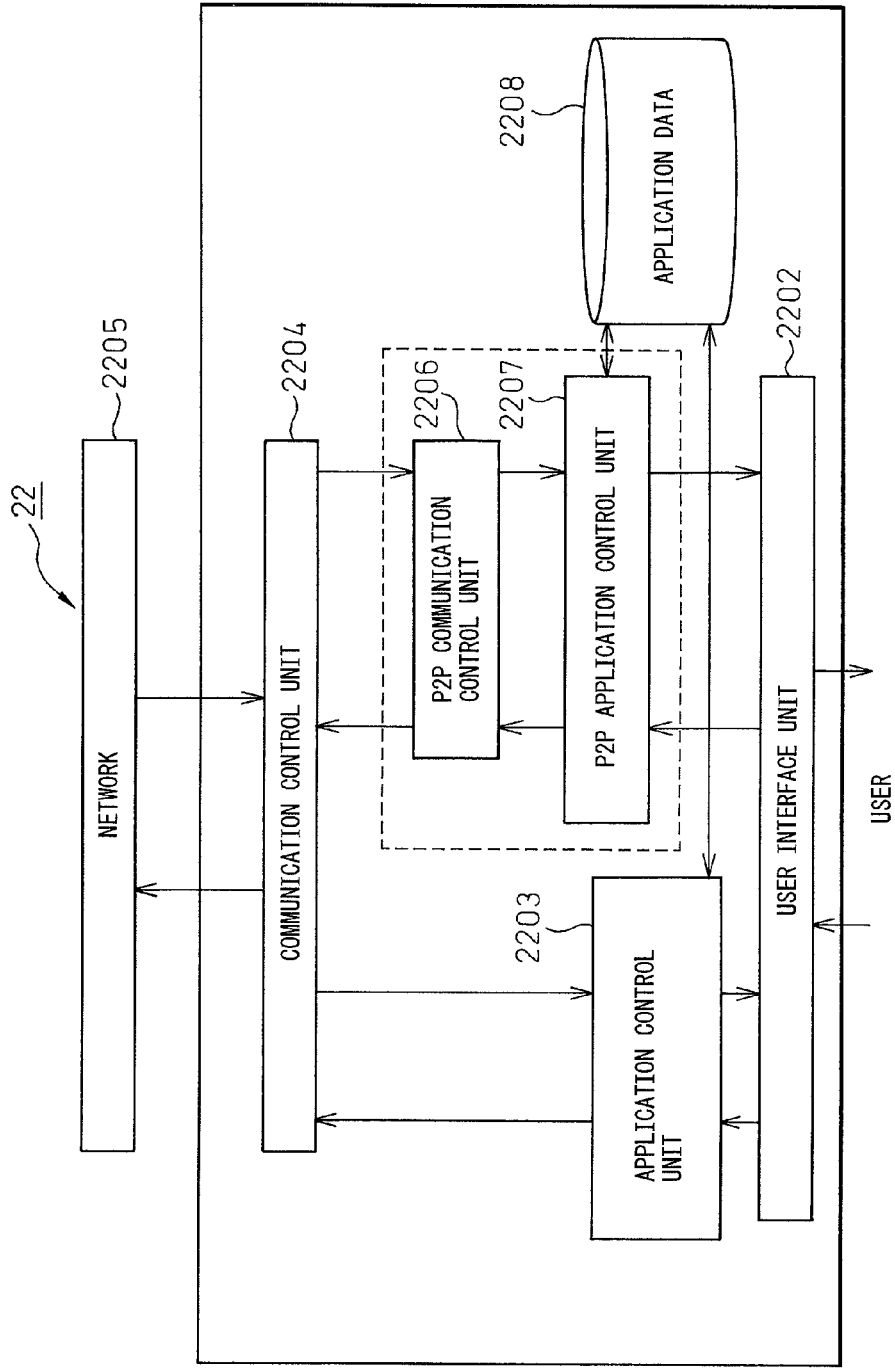
FIG. 7 shows an example of the configuration of a P2P application terminal employed in the present invention.
Figure 8:
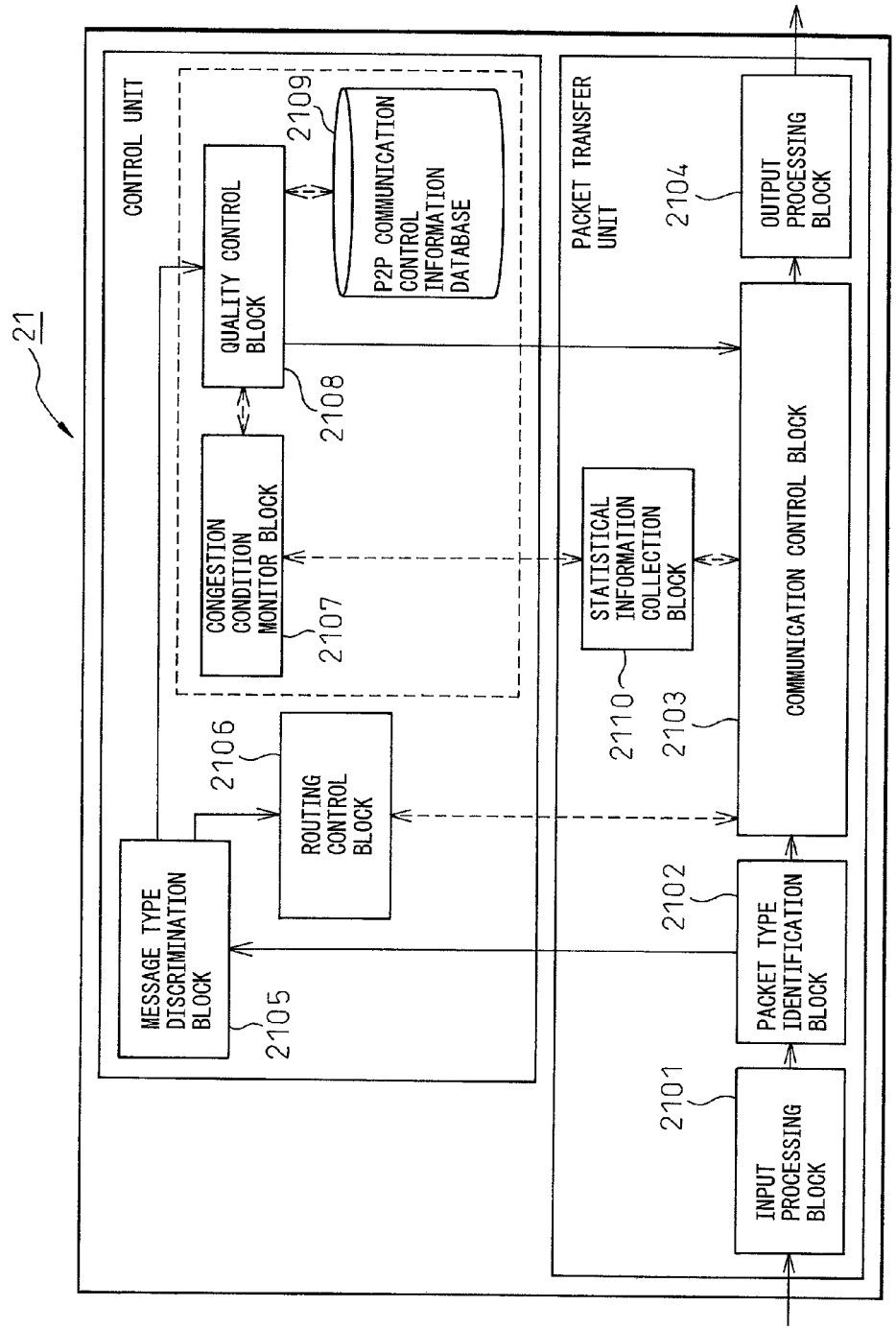
FIG. 8 shows an example of the configuration of a CE router employed in the present invention.
Figure 9:
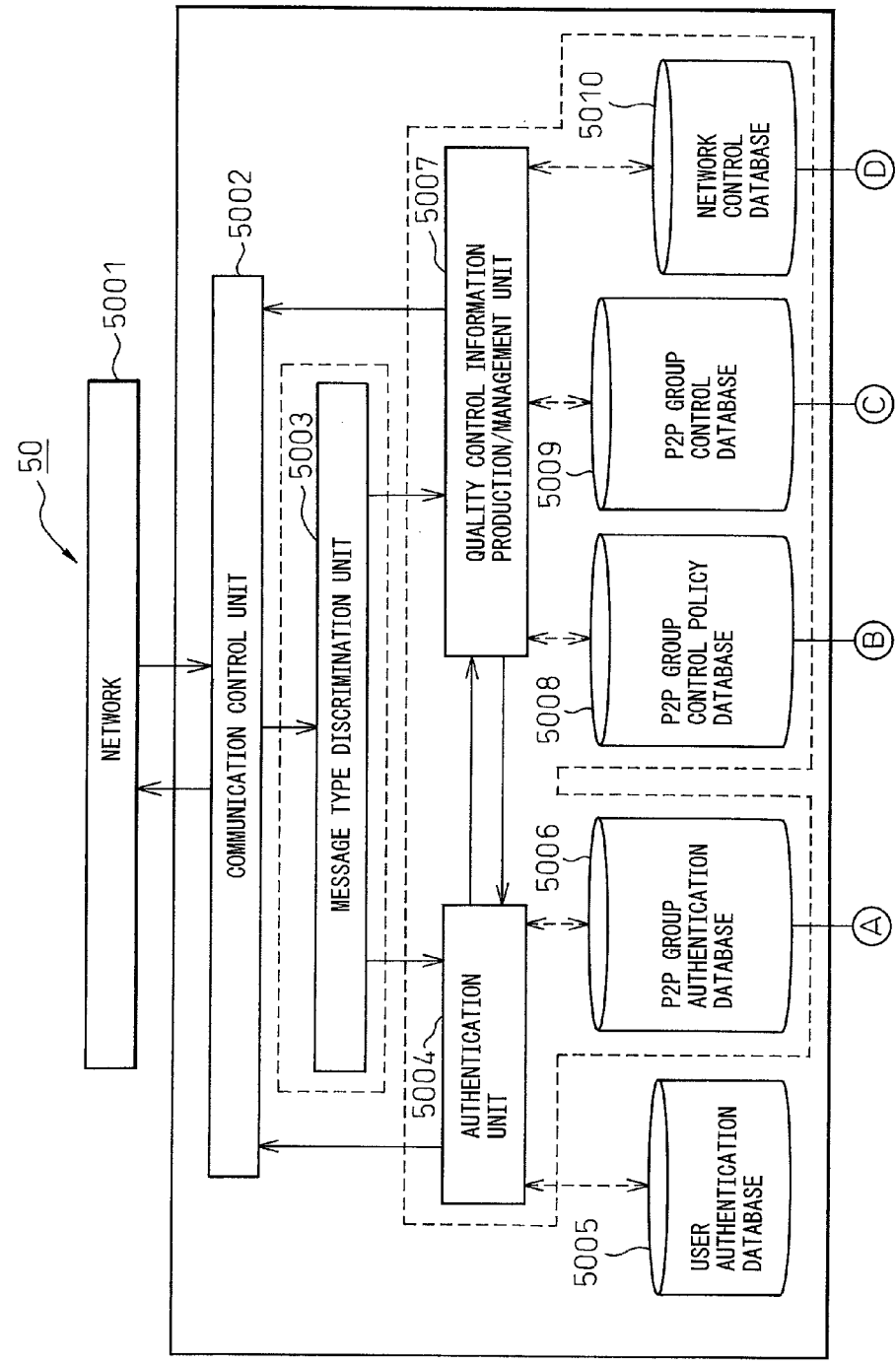
FIG. 9 shows an example of the configuration of an authentication server employed in the present invention.

Referring to FIG. 7 to FIG. 9, concrete examples of the configurations of apparatuses that perform the foregoing activities will be described below. In order to avoid repetition, a description will be made using site 20 as an example. The same applies to sites 30 and 40. In the drawings, portions encircled with a dashed line show major components of the present invention. A description will therefore be made centered on the major components.

FIG. 7 shows an example of the configuration of a terminal employed in the present invention.

In FIG. 7, when a user uses the terminal 22 to issue a request for subscription-related authentication, the user starts P2P applications (2206 and 2207) using a user interface unit 2202. A P2P application control unit 2207 that is one of the started P2P applications issues a subscription-related authentication request message to the authentication server 50, executes authentication relevant to subscription to the P2P group, and controls transmission or reception of the P2P application data. Herein, the P2P communication control unit 2206 merely passes data to be transferred between a communication control unit 2204, which interfaces between a network (carrier core network) 2205 and the terminal, and the P2P application control unit 2207.

The user receives and recognizes the acknowledgement of subscription from the authentication server 50 via the network 2205, the communication control unit 2204 that controls communications protocols (Ethernet and IP) reflecting Layers 3 to 1, the P2P communication control unit 2206, the P2P application control unit 2207, and the user interface unit 2202. In this case, the P2P application control unit 2207 terminates a subscription acknowledgement message, extracts information required for P2P communication from this, and sets the information in the P2P communication control unit 2206. The set information contains a ToS value and a cipher key sent from the authentication server 50.

When P2P communication is initiated in response to a communication initiation instruction entered by a user, the P2P communication control unit 2206 uses the cipher key to encrypt various messages and application data received from the P2P application control unit 2207, and passes the encrypted data to the communication control unit 2204 with an instruction to use the above ToS value for communication packets.

FIG. 8 shows an example of the configuration of a CE router employed in the present invention.

Processes performed between the CE router 21 and authentication server 50 will be described below. When an input processing block 2101 included in the CE router 21 and designed to perform the processes for Layers 2 and 1 receives a packet sent from the authentication server 50, the input processing block 2101 passes the packet to a packet identification block 2102. The packet identification block 2102 recognizes based on an IP address of the packet that the received packet is addressed to its CE router, and passes the packet to a message type discrimination block 2105.

The message type discrimination block 2105 recognizes that a received packet is a communication regulation information message sent from the authentication server 50, and passes the message to a quality control processing block 2108. The quality control processing block 2108 preserves a communication-cease eligible list contained in the communication regulation information message in a P2P communication control information database 2109.

Processes to be performed between the CE router 21 and terminal 22 will be described below. The CE router 21 located between the terminal 22 and authentication server 50 uses a conventional mechanism to monitor flow of traffic from its own site over the carrier core network 10. Specifically, the input processing block 2101 that performs processing for Layer 2 and 1 receives a packet from the terminal 22, and passes the packet to the packet identification block 2102.

The packet identification block 2102 recognizes based on an IP address of the received packet that the packet is a relayed packet addressed to any system other than its CE router, and transmits the received packet to a network interface concerned. At this time, the received packet is passed to a communication control block 2103 that performs quality-of-service (QoS) control, etc. The communication control block 2103 notifies a statistical information collection block 2110 of the results of identification performed by the packet identification block 2102 and the results of control such as packet discarding performed thereby.

The statistical information collection block 2110 collects monitor information, which is employed in the present invention, from the pieces of information that are the result of identification and control. The received packet having passed through the communication control block 2103 is sent to an output processing block 2104 that performs the processes for Layers 2 and 1, and transmitted via the network interface connected to the carrier core network 10.

In the present invention, monitor information collected by the statistical information collection block 2110 is used to make a decision on congestion and looking up the communication-cease eligible list preserved in the P2P communication control information database 2109. Specifically, a congestion condition monitor block 2107 regularly observes information in the statistical information collection block 2110, and determines the number of transmitted communication cease instructions corresponding to the number of discarded packets. The quality control processing block 2108 determines the same number of P2P packets as the determined number of transmitted communication cease instructions in ascending order of priority on the basis of ToS values recorded in the communication-cease eligible list preserved in the P2P communication control information database 2109, and instructs the communication control block 2103 to cease communications of the respective packets.

The communication control block 2103 produces the same number of communication cease instruction packets as the determined number of transmitted communication cease instructions by using destination IP addresses specified in respective P2P packets whose communications should be ceased. The output processing block 2104 transmits the produced packets to the network interface that is not shown and that is connected to site 20.

For example, the congestion condition monitor block 2107 can determine the number of discarded packets by performing a calculation expressed by the equation (a) presented below. Herein, an moving average (N_dis_mean) presented below is calculated. When the moving average value exceeds a predetermined threshold, communication cease is instructed. After the moving average value exceeds the threshold, the number of issued communication cease instructions proportional to the moving average value is determined.

$$N\_dis\_mean \leqq Wn \times N\_dis + (1-Win) \times N\_dis\_mean \quad (a)$$

where N_dis_mean denotes a moving average number of discarded packets, N_dis denotes the number of discarded packets observed when information is read from the statistical information collection block, and Wn denotes a weight coefficient.

Figure 10A:
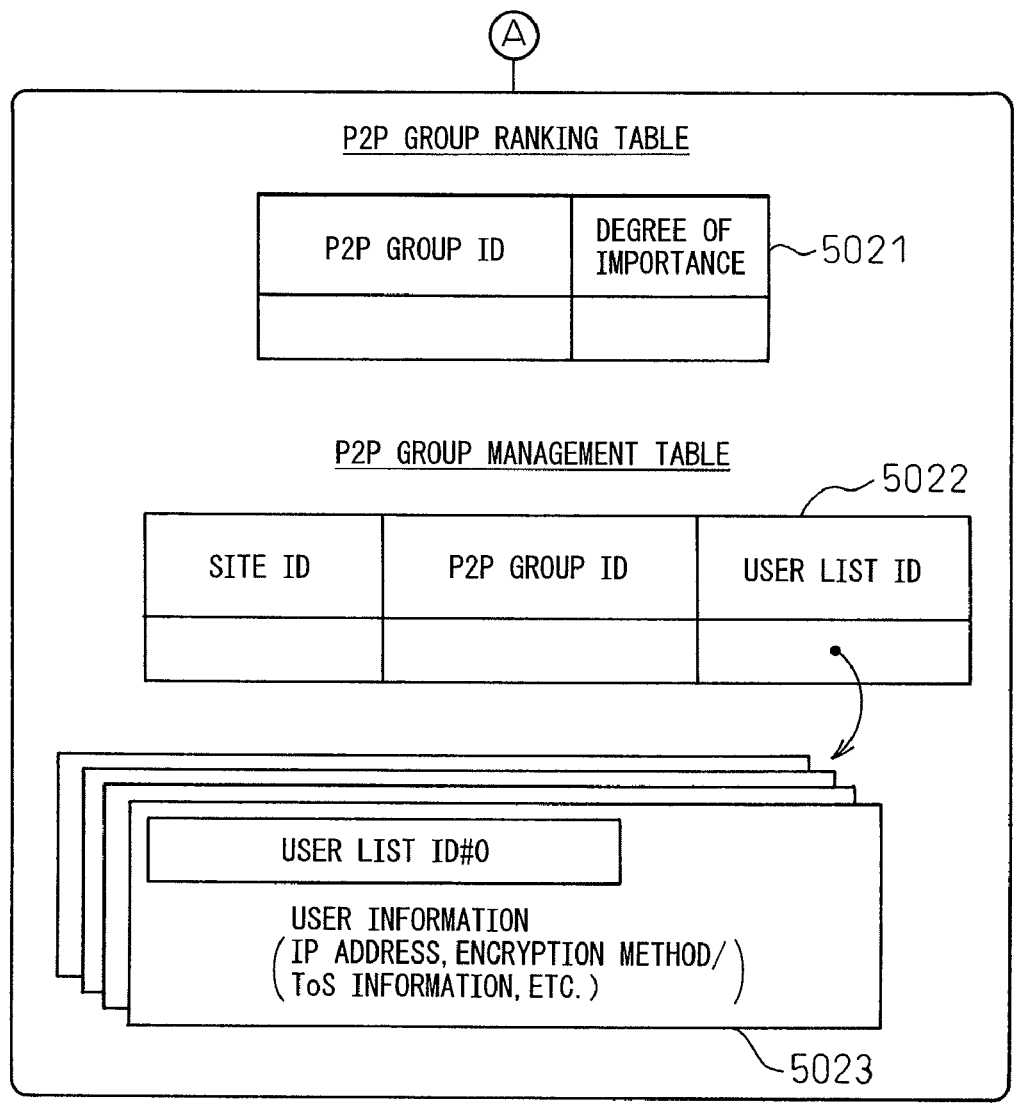
FIG. 10A shows an example (1) of the structure of a table contained in a database shown in FIG. 9.
Figure 10B:
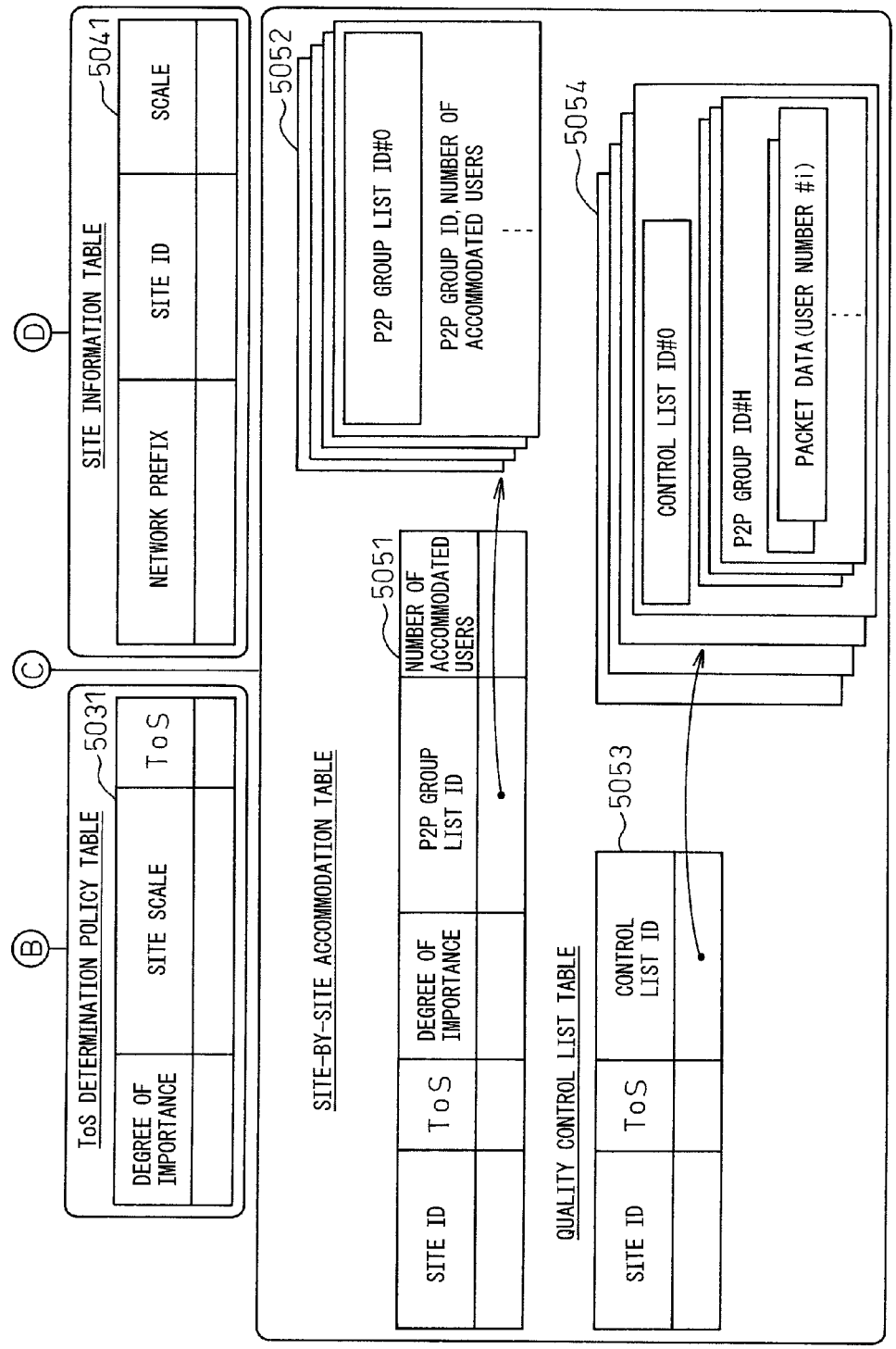
FIG. 10B shows an example (2) of the structure of a table contained in a database shown in FIG. 9.

FIG. 9 shows an example of the configuration of an authentication server employed in the present invention. FIG. 10A and FIG. 10B show examples of tables contained in databases shown in FIG. 9. FIG. 11 describes an example of use of the tables shown in FIG. 10A and FIG. 10B for authentication. FIG. 12 describes an example of use of the tables shown in FIG. 10A and FIG. 10B for production of communication cease instruction information.

Referring to FIG. 9, the authentication server 50 receives a packet sent from a user over a network 5001 that is a carrier core network, and passes the packet to a message type discrimination unit 5003 via a communication control unit 5002 that controls communications protocols (ex. Ethernet and IP) defined in Layer 3 and Layer 2. The message type discrimination unit 5003 discriminates a subscription-related authentication request message on the basis of port information in Layer 4, and transfers the message to an authentication unit 5004 (S401).

The authentication unit 5004 executes authentication while communicating with the terminal 22 via the communication control unit 5002. The authentication unit 5004 first acquires a user ID and a password which are entered by a user, and then references a user authentication database 5005 so as to authenticate the user. When the user is identified as a registered user, a P2P group authentication database 5006 is referenced in order to decide in relation to information on qualification of the user and information on the contents (nature and major purport) of a group whether the user can be permitted to subscribe to a P2P group (P2P group A or B in FIG. 6) to which the user wants to subscribe (S402).

If the user is permitted to subscribe to the P2P group, a P2P group rating table 5021 (A in FIG. 10A) contained in the P2P group authentication database 5006 is looked up in order to retrieve a degree-of-importance index (high or low priority level) assigned to P2P group D to which the user is permitted to subscribe (S403). Thereafter, the IP address of the subscription requesting user, the P2P group ID of the P2P group to which the user is permitted to subscribe, and the retrieved degree-of-importance index are passed to a quality control information production/management unit 5007.

The quality control information production/management unit 5007 first references a site information table 5041 (D in FIG. 10B) contained in a network control database 5010, and retrieves the ID of a site, to which the user has the terminal thereof connected, and the scale thereof in association with a network prefix value specified in the received IP address (S404). Herein, what is referred to as the scale of a site is, for example, a contracted bandwidth to a line leading to a carrier network.

The quality control information production/management unit 5007 then looks up a ToS determination policy table 5031 (B in FIG. 10B) contained in a P2P group control policy database 5008, and determines a ToS value (a priority level number or the like) associated with the retrieved degree-of-importance index and site scale (S405). The quality control information production/management unit 5007 notifies the authentication unit 5004 of the ToS value and site ID, and updates a site-by-site accommodation information table 5051 (C in FIG. 10B) that is recorded in relation to each site in a P2P group control information database 5009. Herein, in relation to the site (site ID) to which the user has the terminal thereof connected, the ID of the P2P group to which the user is permitted to subscribe is added to a list 5052 in which P2P groups accommodated by the site are recorded, and the degree of importance of the site is recorded. The number of accommodated users is incremented by one due to the subscription of the user (S408).

On the other hand, when the authentication unit 5004 is notified of the site ID and ToS value by the quality control information production/management unit 5007, the authentication unit 5004 accesses a P2P group management table 5022 (A in FIG. 10A) contained in the P2P group authentication database 5006. The authentication unit 5004 retrieves a user list ID associated with the site ID and P2P group ID, and records user authentication information on the user, of which subscription is permitted, in a user list 5023 assigned the user list ID (S406). The authentication unit 5004 then sends an acknowledgement message, which includes information (cipher key, ToS value and etc.) which the terminal 22 requires to actually peer-to-peer-communicate with the members of the P2P group and which is included in the user authentication information, to the terminal 22 via the communication control unit 5002 (S407).

When a generation for P2P communication cease instruction information comes at intervals of a predetermined cycle (S501), quality control information production/management unit 5007 searches the site-by-site accommodation information table 5051 (C in FIG. 10B) contained in the P2P group control information database 5059, sorts P2P group into lists 5052 in ascending order of a degree of importance dependent on a ToS value in association with each site, and creates a list into which the lists are integrated (S502). The quality control information production/management unit 5007 then records the list in a quality control table 5053 as an entry associated with the site relative to which P2P communication cease instruction information is produced (S503).

The quality control information production/management unit 5007 sequentially retrieves P2P group IDs from the P2P group ID list specified as an entry (S504), and transmits the P2P group IDs to the authentication unit 5004 together with the site ID. The authentication unit 5004 searches the P2P group management table 5022 contained in the P2P group authentication database 5006 in association with the received site ID and P2P group IDs, and thus retrieves pieces of user information 5023 on users who have subscribed to group communication performed within the respective groups assigned to the P2P group IDs (S505). The authentication unit 5004 then produces packets that represent an encrypted group withdrawal request message and that are to be sent to the users (S506), and returns the packets to the quality control information production/management unit 5007.

The quality control information production/management unit 5007 creates control lists 5054. Each list is assigned a control list ID for each site concerned and has the group withdrawal request message packets for the each subscriber users. This information of these packets is returned from the authentication unit 5004 (S507 to S509). The control lists 5023 are delivered to the CE router in the associated site via the communication control unit 5002.

As mentioned above, according to the present invention, based on communication priority information dependent on a degree of importance which a terminal is notified by the authentication server, and communication-cease eligible group ranking list information that is periodically delivered from the authentication server to a router and that relates to the communication priority information, the router can instruct terminals, which have subscribed to the group, to cease communication based on detected congestion. Consequently, a communication control system capable of ensuring quality (i.e. avoiding discarding of important information) according to a priority level of communication (i.e. a degree of importance of information) can be constructed. In particular, when P2P communication is under way or when a large amount of traffic takes place and it is hard for any other network system to control equipments installed in each sites due to congestion, an expensive dedicated router that performs high-order layer processing or high-speed processing required for P2P communications need not be adopted, but existing routers and network resources can be used to construct a P2P network.

Moreover, according to the present invention, the authentication server periodically produces communication regulation information, and delivers the information to the router. Consequently, since production of communication cease instruction information can be scheduled to be performed relative to each site dominated by each router, processing load that the authentication server has incurred can be smoothed out. Moreover, system construction need not be performed in anticipation of an instantaneous increase in the load, and construction expense can be lowered. Furthermore, the authentication server can create a cease-communication eligible group ranking list on the basis of a site scale. Consequently, a site in which the number of groups exceeding predetermined congestion can be predicted and selectively notify the latest cease communication instruction information.

Furthermore, according to the present invention, the authentication server appends a communication cease request packet, which is encrypted in order to lighten the processing load of a router, to a cease-communication eligible group ranking list. A router therefore need not perform encryption and should incur only a small processing load. Thus, the processing load of a low-performance router that is installed in a small-scale site is reduced. On the other hand, a router accommodating a large-scale site may produce an encrypted communication cease request packet on the basis of received encryption information in order to lighten a load that the authentication server incurs. In this case, the router may produce the communication cease request packet at the time of discriminating congestion, or may produce it during a period of time when the load is low and that succeeds reception of information from the authentication server.

For creation of a cease-communication eligible group ranking list, the number of terminals accommodated by each site may be managed in units of a group, and the cease-communication eligible group ranking list may be created based on the number of accommodated terminals for each packet priority level. For example of a control policy, communication of low priority groups with the large number of accommodated terminals in a site is ceased in advance of high priority or small groups in order to quickly avoid congestion. i.e. communication in respective groups is ceased in descending order of the number of accommodated terminals in each site. On the other hand, communication of high priority groups is ceased in ascending order of the number of accommodated terminals in each site. Thus, not only a control policy based on priorities, but also a control policy that takes into consideration the number of terminals accommodated in each site or the nature of the site can be applied.

What is claimed is:

1. A communication control system, comprising:
   an authentication server that authenticates a terminal which requests subscription to a network, sends communication priority information to the terminal whose subscription is permitted, and delivers communication regulation information based on the communication priority information to a router which accommodates the terminal:
   a terminal that uses a packet, in which the communication priority information sent from the authentication server is marked, to perform communication after having subscription thereof permitted; and
   a router that monitors the packet sent from the terminal, and imposes a communication regulation on the terminal according to the communication regulation information based on the communication priority information and delivered from the authentication server, wherein:
   the terminal requests subscription to a predetermined group;
   the authentication server determines the communication priority information on the basis of the degree of importance of the group, periodically creates as the communication regulation information a cease-communication eligible group ranking list according to the degree of importance of the group, and delivers the cease-communication eligible group ranking list to the routers;
   the router monitors an amount of traffic represented by the packet in relation to each communication priority information so as to sense a congestion condition; and
   when having sensed congestion, the router uses the cease-communication eligible group ranking list to request the terminal, which belongs to a group whose degree of importance is low, to cease communication.

2. The communication control system according to claim 1, wherein the authentication server creates a cease-communication eligible group ranking list on the basis of the scale of a she dominated by the router.

3. The communication control system according to claim 2, wherein assuming that the she scale is expressed by the number of groups to which terminals dominated by the router subscribe, when the number of groups is equal to or larger than a predetermined value, the authentication server creates the cease-communication eligible group ranking list to be delivered to the router, and delivers it to the router.

4. The communication control system according to claim 1, wherein:
   the authentication server sends the communication priority information and encryption information on a group, to which the terminal subscribes, to the terminal; and
   the terminal encrypts the packet, in which the communication priority information is marked, using the encryption information, and then performs communication.

5. The communication control system according to claim 4, wherein:
   the authentication server appends the encryption information to the cease-communication eligible group ranking list to be delivered to the router; and the router uses the communication cease request packet, which is encrypted using the encryption information, to request the terminal to cease communication.

6. The communication control system according to claim 5, wherein:
the authentication server appends the communication cease request packet, which is encrypted using the encryption information, instead of appending the encryption information to the cease-communication eligible group ranking list; and the router uses the encrypted communication cease request packet, which is received from the authentication server, to request the terminal to communication cease.

7. The communication control system according to claim 1, wherein the network is an enterprise network that is a peer-to-peer (P2P) network, the terminal is a P2P application terminal, the group is a P2P group, and the router is a customer edge (CE) router.

* * * * *